Patented Feb. 19, 1924.

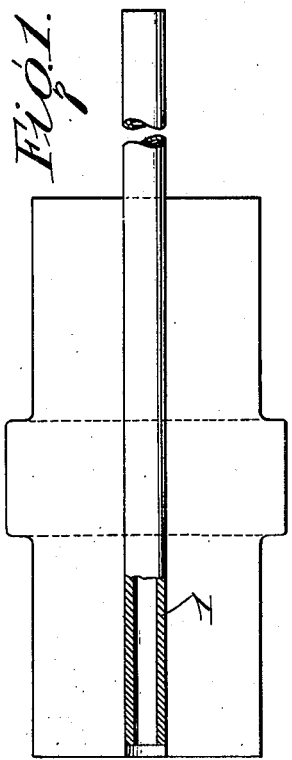
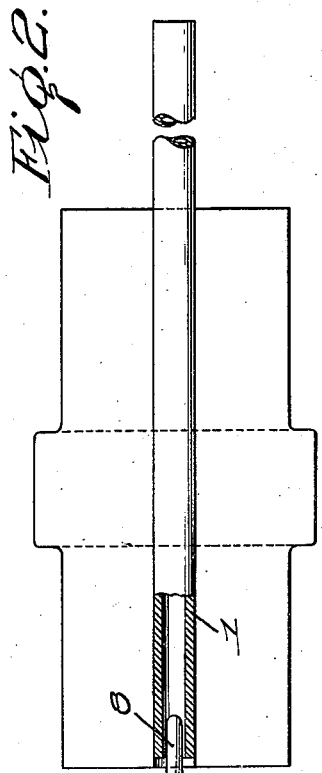
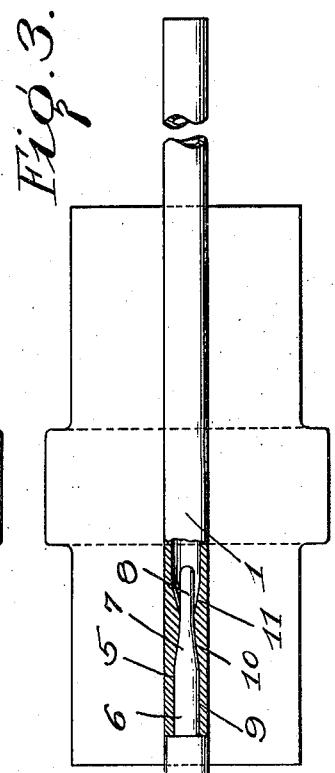

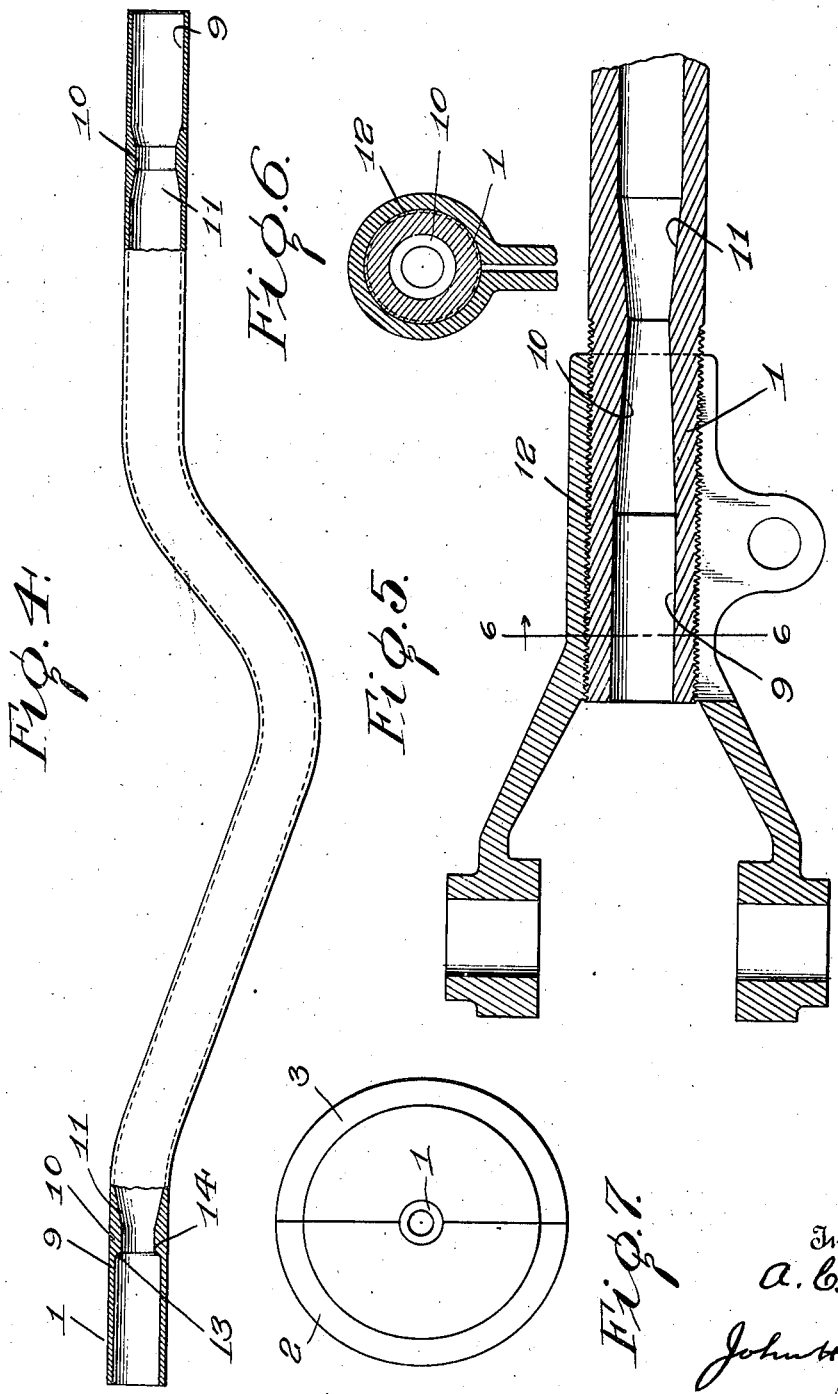

1,483,947

UNITED STATES PATENT OFFICE.

ALONZO C. MORSE, OF MANSFIELD, OHIO.

REACH ROD AND METHOD OF FORMING THE SAME.

Application filed December 11, 1922. Serial No. 606,127.

*To all whom it may concern:*

Be it known that ALONZO C. MORSE, citizen of the United States of America, residing at Mansfield, in the county of Richland and State of Ohio, has invented certain new and useful Improvements in Reach Rods and Methods of Forming the Same, of which the following is a specification.

This invention relates to a method of and means for internally upsetting a tubular member, seamless drawn tubing, or the like.

In certain lines of manufacture, particularly automobile construction, lightness without sacrifice of requisite strength is highly desirable, and therefore the tube-like formation for certain parts of the automobile has become standard. In the use of the tube-like part, however, provision must be made for the connection of the cooperating parts therewith. This almost invariably involves the use of threads on the tube-part, both for convenience and to permit necessary adjustment, and in such thread formation in a normal tube part, the strength of the material is weakened to the extent of the thread cut.

Furthermore, in the use of tube-parts for particular purposes, as, for example in forming reach rods, provision must be made for a seat or back stop in the interior of the housings forming the sockets for the ball end of the steering crank arm; and this particular result has been heretofore sought by welding a tube of requisite socket proportions to the end of a drawn-down or reduced portion of the tube part, or by expanding the ends of the tube-parts to an increased and socket proportion. In both these methods, the desired back-stop is formed, but these methods are commercially objectionable, owing to the inability of insuring a perfect weld at all times, where the welding process is used, and the weakening of the tube part, through distortion and disarrangement of the steel fibers, where the expanding process is used.

The present invention is therefore directed to a particular manner of and means for so upsetting the ends of the tube part, as to increase the thickness of the wall of the tube, without disturbing the external diameter thereof. The tube part is thus thickened or upset interiorly, and this upset may thus simply increase the tube wall to compensate for the cutting of external threads therein, or may, at the same time and at the same operation form the shoulder or back stop interiorly of the tube for the ball-sockets, or the like.

It is characteristic of the present invention that the means employed to carry out the present method involves no departure from the well-known methods of treatment, so that it can be safely urged from a technical standpoint that the results of the present method materially increase the strength of the tube at those parts most requiring strength, and additionally to the strength increase, interiorly form the tube for the specific results desired. Thus at a single operation, the tube end is formed to compensate for the loss of material in cutting the external threads, thus avoiding loss of strength through such cutting, and also formed with the internal shoulder or back stop necessary to receive and limit movement of the ball-socket in one direction. This entire result is secured without external enlargement of the tube, without welding of additional parts thereto, and without drawing of the tube.

Furthermore, the method employed involves the use of simple means, can be simply and expeditiously carried out to substantially any degree of end thickening, and involves practically a single step or operation, following the heating of the tube-end.

The means employed to carry out the method, comprise a sectional die, in which method, the heated end of the tube is placed, and by which the normal external diameter of the tube is maintained, and a plunger adapted to enter the die opening and having a diameter slightly less than the external diameter of the tube. A former is carried by the plunger to pass within the tube as the plunger advances. This former is of a substantially tapered form for a portion of its length, with an end portion of uniform diameter substantially equal to the minimum diameter of the tapered portion. With the former within the tube, the endwise pressure of the plunger on the tube confined exteriorly by the die, causes the tube metal to flow to the extent permitted by the former. Thus, the interior of the tube is upset or thickened, as is desired.

The invention is illustrated more or less diagrammatically in the accompanying drawings, in which:—

Fig. 1 is a view showing the tube end held in the die, and the plunger ready to enter the end of the tube.

Fig. 2 is a similar view with the former partly inserted in the tube.

Fig. 3 is a similar view with the plunger and former in final positions, and the tube material embracing the former to complete the upsetting of such tube.

Fig. 4 is a view in elevation, partly in section, of a curved reach rod for automobiles, showing the interior shoulder or back stop for the ball-socket.

Fig. 5 is a sectional view of one end of a tie rod, with the end formed according to the present method.

Fig. 6 is a section on line 6—6 of Fig. 5.

Fig. 7 is an end view of the die, the sections being shown separable.

In carrying out the method of the present invention, the tube end 1, after being properly heated, is placed between the die sections 2 and 3. These die sections are formed to receive and grip the tube end between them, one of the sections, as 2, being movable relative to the other to permit the application and withdrawal of the tube.

The heated tube end, held in the dies to maintain an invariable and constant exterior diameter, that is prevent the tube from exteriorly enlarging, is subjected to the action of a longitudinally-reciprocating plunger 4, of a size to pass within the die opening, but of a diameter greater than that of the interior of the tube. This plunger is provided with a former 5, having a part 6 next the plunger of substantially the normal interior diameter of the tube, a contiguous part 7, which gradually tapers from the plunger, and an end part 8, of a diameter substantially that of the minimum diameter of the part 7.

The former enters the end of the heated tube, and the plunger directly engages and exerts endwise pressure on such tube end. The material of the tube will flow to an interior formation corresponding to that of the former, which formation is shown more particularly in Figs. 4 and 5, wherein the interior of the tube is of normal diameter for a distance from its end, as at 9, then converges for a distance, as at 10, and then diverges to the normal tube diameter, as at 11. Thus the interior of the tube may be said to have a double conical, or double flaring interior thickening, with the maximum diameter of such flaring portions that of the normal tube, and the minimum diameters less than that of the normal tube.

The tube end within the length of the interiorly-thickened portion is to receive the external threads 12, usually provided, and it will be noted that the material cut in the formation of these threads is fully and completely compensated for in the increased thickness of the tube wall resultant from the present method.

In making provision for the reception of the ball socket, as required in reach rods, the former may be so shaped as to form more or less of a shoulder, as indicated at 13 in Fig. 4, at the end of the plain portion 6 of the former, thus providing an abrupt shoulder or back stop in the tube end. The former shown in Figs. 1, 2, and 3, will provide for the same result, as the beginning of the converging of the interior diameter of the tube wall, as indicated at 14, Fig. 3, may be rendered more abrupt and rounded by obvious mechanical handling to provide the back stop, or under some circumstances, the converging portion of the interior of the tube may, of itself, and without further operations, serve as such back stop.

The method and means described, therefore, provides the tube part with an internal upset to form a limiting means for a ball-socket, and also provides a thickening of the tube wall at that portion otherwise weakened in the formation of external screw-threads.

Having thus described the invention, what is claimed as new, is:—

1. The method of forming the end of a steering reach rod, consisting in confining the tube against external expansion, and inserting within the tube a former shaped to accurately fit and maintain the normal interior diameter for a determinate distance from the end of the tube, with the former remote from the tube end of less than the tube diameter, and exerting endwise pressure on the tube.

2. A reach rod of hollow construction, the end of the rod being of normal exterior and interior diameter, the interior of the rod inwardly of the end having a tapering annular inward projection.

In testimony whereof I affix my signature.

ALONZO C. MORSE.